United States Patent
Ozawa

(10) Patent No.: US 9,070,078 B2
(45) Date of Patent: Jun. 30, 2015

(54) TRANSFER SYSTEM AND PRINTING APPARATUS

(71) Applicant: Seiko Epson Corporation, Tokyo (JP)

(72) Inventor: Koji Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/205,142

(22) Filed: Mar. 11, 2014

(65) Prior Publication Data

US 2014/0268228 A1 Sep. 18, 2014

(30) Foreign Application Priority Data

Mar. 14, 2013 (JP) .................................. 2013-051384

(51) Int. Cl.
*G06K 15/00* (2006.01)

(52) U.S. Cl.
CPC ...................................... *G06K 15/40* (2013.01)

(58) Field of Classification Search
USPC ........... 358/445, 1.15, 1.2, 1.9, 2.1, 401, 405, 358/406, 409, 410, 411, 419, 420, 425, 358/426.02, 434
See application file for complete search history.

(56) References Cited

U.S. PATENT DOCUMENTS

| | | | | |
|---|---|---|---|---|
| 5,473,757 A | * | 12/1995 | Sexton | 700/2 |
| 5,675,273 A | * | 10/1997 | Masleid | 327/156 |
| 6,130,563 A | * | 10/2000 | Pilling et al. | 327/111 |
| 6,711,697 B1 | | 3/2004 | Tanaka | |
| 2006/0255836 A1 | * | 11/2006 | Ikeda | 326/83 |
| 2007/0040795 A1 | * | 2/2007 | Lee et al. | 345/100 |
| 2008/0122514 A1 | * | 5/2008 | Tachibana et al. | 327/291 |
| 2012/0081177 A1 | * | 4/2012 | Nuebling et al. | 327/590 |
| 2012/0281489 A1 | * | 11/2012 | Ware et al. | 365/203 |
| 2013/0264982 A1 | * | 10/2013 | Cheng | 318/400.26 |
| 2014/0082397 A1 | * | 3/2014 | Shin et al. | 713/401 |
| 2014/0266320 A1 | * | 9/2014 | Conrow et al. | 327/108 |

FOREIGN PATENT DOCUMENTS

| | | | |
|---|---|---|---|
| JP | 2001-127827 A | 5/2001 | |
| JP | 2005176518 | * 6/2005 | B41J 19/18 |

* cited by examiner

*Primary Examiner* — Jerome Grant, II
(74) *Attorney, Agent, or Firm* — Kilpatrick Townsend & Stockton LLP

(57) ABSTRACT

A controller transfers first data to a first control circuit in correspondence with a single data line at a rising edge of a clock pulse on a single clock line, and transfers second data to a second control circuit in correspondence with the single data line at a falling edge of the clock pulse.

6 Claims, 4 Drawing Sheets

TRANSFER SYSTEM AND PRINTING APPARATUS

This application claims priority to Japanese Application No. 2013-051384, filed on Mar. 14, 2013, the entirety of which is hereby incorporated by reference.

BACKGROUND

1. Technical Field

The present invention relates to transfer systems and printing apparatuses.

2. Related Art

Various attempts at techniques for transferring data efficiently while simplifying the wiring necessary for the data transfer have been made thus far (JP-A-2001-127827, for example).

A configuration such as that shown in FIG. 4 can be considered as an example in which some of the wires used in the transfer of data are shared. A motor driver A and a motor driver B each drive a corresponding motor. To simplify the separation of control parameters involved in motor control, the transfer of the control parameters for controlling one of the motors is started after the transfer of the control parameters for controlling the other motor ends.

If a situation occurs where it is necessary to control the motors based on the control parameters at essentially the same time, a configuration such as that shown in FIG. 4 does not allow the transfer of the control parameters for the one motor to be immediately started after the transfer of the control parameters for the other motor has been started; this results in downtime until the control of the one motor can be started, which in turn may result in an inability to control the motors at the proper timing.

SUMMARY

It is an advantage of some aspects of the invention to provide a transfer system that enables processing to be carried out immediately in configurations where some of the wires used in the transfer of data are shared.

Having been conceived in order to solve at least some of the aforementioned problems, the invention can be implemented as the following aspects or application examples.

First Aspect

A transfer system according to this aspect includes a plurality of control circuits that control respective electric motors, and a controller, connected to the plurality of control circuits via a single data line and a single clock line, that serially transfers data instructing control of the electric motors to each of the plurality of control circuits; here, the controller transfers first data to a first of the control circuits in correspondence with the single data line at a rising edge of a clock pulse on the single clock line, and transfers second data to a second of the control circuits in correspondence with the single data line at a falling edge of the clock pulse.

According to this configuration, the data for the first control circuit and the data for the second control circuit are transferred in correspondence with the rise and fall, respectively, of the clock pulse, and thus the respective data transfers can be started at a time difference small enough to not affect the immediacy of the control; this enables the respective control circuits to carry out processing immediately. Furthermore, which control circuit the data is destined for is determined based on the correspondence relationship between the edge of the clock pulse and the data, and thus the destination of the data can be identified and the data can be separated with ease.

Second Aspect

It is preferable for the transfer system according to the aforementioned aspect to further include a single load line serving as a line connecting the controller to the plurality of control circuits, for the controller to transfer a signal defining a range of bit data that configures the first or the second data to the load line in correspondence with an edge of the clock pulse, and for the first control circuit and the second control circuit to identify the corresponding bit data based on the edges of the clock pulse and execute control of the electric motor indicated by the bit data in a range of the corresponding bit data based on the edges of the clock pulse and a signal on the load line.

According to this configuration, a shared load line can be used for breaks between bit data configured of the first data and the second data, making it possible to simplify the wiring.

Third Aspect

In the transfer system according to the aforementioned aspects, it is preferable that the electric motors be stepper motors that rotate based on a pulse indicated by the data or DC motors that rotate in accordance with a DC current supplied based on a command indicated by the data, and one of the control circuits control the rotation of one of the stepper motors or a plurality of the DC motors.

Furthermore, by applying the aforementioned transfer system in a printing apparatus, a plurality of driving instances can be executed asynchronously in the printing process, which makes it possible to accelerate printing processes.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

Embodiment

Figure 1:
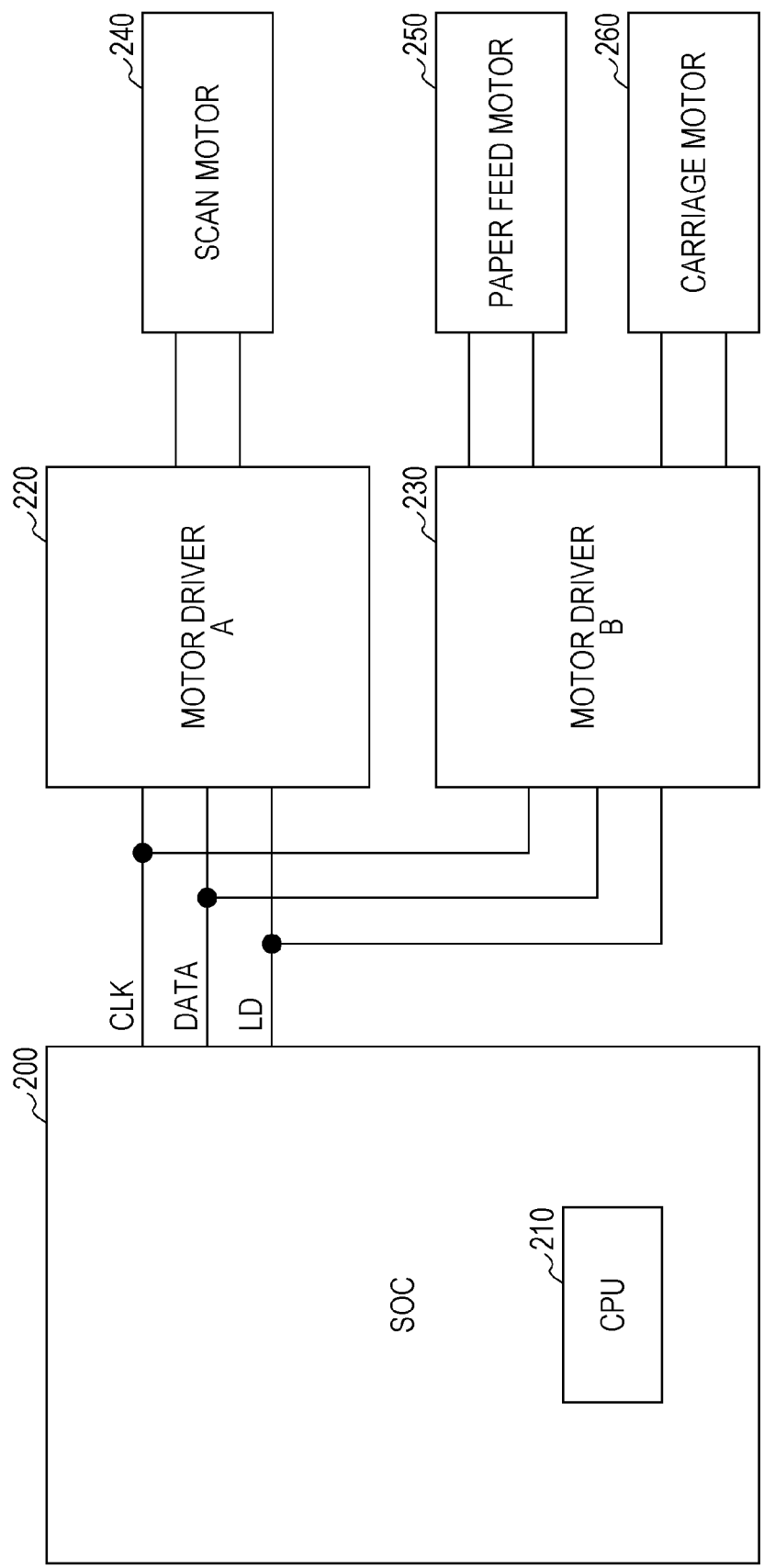
FIG. 1 is a diagram illustrating some elements of hardware that controls motor driving.

FIG. 1 is a diagram illustrating some elements of hardware that implement a data transfer function for motor control, in a printing apparatus that includes a transport unit that transports paper, a carriage unit that includes a recording head and that travels in a main scanning direction, a scanner unit that reads a document, and an operating unit that accepts user operations (the various units of the printing apparatus are not shown here). An SOC 200 is a controller that includes a CPU 210 as well as a memory, controller circuitry, and so on (not shown), and that controls motors.

A motor driver A 220 includes a control circuit that controls the rotation of a scan motor 240 for driving the scanner unit, and functions as a scanner driving control unit.

A motor driver B 230 includes control circuits that control the rotation of a paper feed motor 250 for driving the transport unit and the rotation of a carriage motor 260 for driving the carriage unit, respectively. The motor drivers are assumed to be ICs configured as entities separate from the SOC 200, but may be incorporated into the SOC as well. Note that the scan motor 240 is assumed to be a stepper motor in this embodiment. Furthermore, although the paper feed motor 250 and the carriage motor 260 are assumed to be DC motors driven by a DC current, the invention is not limited thereto, and any electric motor may be used.

The transfer of data between the SOC 200 and the motor driver A 220 and between the SOC 200 and the motor driver B 230 employs a serial interface scheme, and the data is transferred using three lines, namely a clock line (CLK), a data line (DATA), and a load line (LD). Because only one set of the three lines is used by the SOC 200 for data transfer, each of the CLK, DATA, and LD lines branches into two, and the resulting branches are connected to the motor driver A 220 and the motor driver B 230, respectively.

The amount of data transferred between the SOC 200 and the motor driver A 220 and between the SOC 200 and the motor driver B 230 varies depending on the operations performed by the printing apparatus. For example, in the case where the printing apparatus is to copy a document, it is necessary for an image sensor portion of the scanner unit to move in a highly-precise manner while reading the document. Accordingly, the SOC 200 sends driving instruction data to the motor driver A 220 with each unit of control steps, such as with each phase switch or the like, in order to drive the stepper motor that serves as the scan motor 240 with a high level of precision.

Furthermore, the SOC 200 sends command data for driving the paper feed motor 250 and the carriage motor 260, respectively, to the motor driver B 230, in order to sequentially print image data obtained by reading the document. Accordingly, because the SOC 200 instructs the motor driver A 220 to drive the scan motor 240 and instructs the motor driver B 230 to drive the paper feed motor 250 or the carriage motor 260 in an asynchronous manner, there are cases where, depending on the timing, control based on the control parameters will be instructed at approximately the same time. (In this embodiment, the motor control parameters transferred by the SOC 200, such as driving instruction data for the stepper motor, command data for the DC motor, and so on, are sometimes referred to as "data", "commands", "parameters", and so on.)

Figure 2:
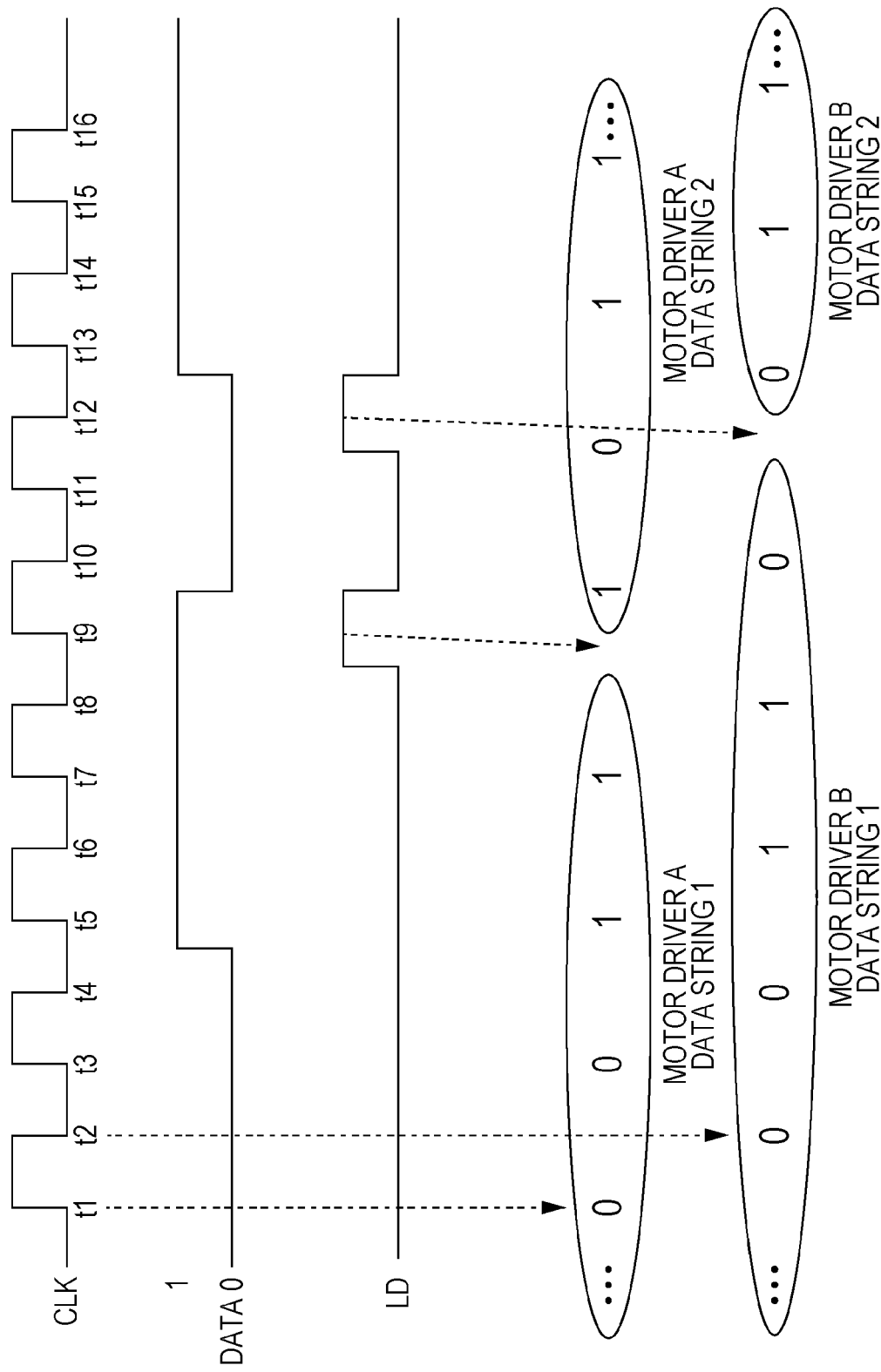
FIG. 2 is a diagram illustrating an example of the format of data transferred between an SOC and motor drivers.

FIG. 2 is a diagram illustrating an example of the format of the data transferred between the SOC 200 and the motor driver A 220 and between the SOC 200 and the motor driver B 230. This embodiment focuses on data transferred from the SOC 200 to the motor driver A 220 and the motor driver B 230. The data for the motor driver A 220 corresponds to DATA bit values at the rises of the CLK clock pulse (t1, t3, . . . , t15). Likewise, the data for the motor driver B 230 corresponds to DATA bit values at the falls of the CLK clock pulse (t2, t4, . . . , t16). In other words, the SOC 200 transfers a value obtained by taking the logical sum of the bit values serving as the data for the motor driver A 220 and the bit values serving as the data for the motor driver B 230 to DATA.

Breaks between individual data bit strings configured of a plurality of bit data are associated with LD. In this embodiment, LD being ON when CLK rises indicates a break in the motor driver A 220 data, whereas LD being ON when CLK falls indicates a break in the motor driver B 230 data. Accordingly, upon detecting a break in the data, the motor driver A 220 and the motor driver B 230 recognize the bit string obtained up until that point as a single piece of data. In other words, the LD signal defines the range of the obtained data by being transferred, a single time or over a plurality of times, in correspondence with the edges of the clock pulse, and thus has a function for defining commands, parameters, and so on as a single unit of data.

Note that the data processed by the motor driver A 220, the motor driver B 230, and so on is configured of a plurality of bit strings. This embodiment assumes that the data is in 8-bit units, or in other words, in byte units. The data may have lower or greater bit numbers, or the data may have variable-length bit numbers based on the format of the commands, the parameters, and so on.

Figure 3:
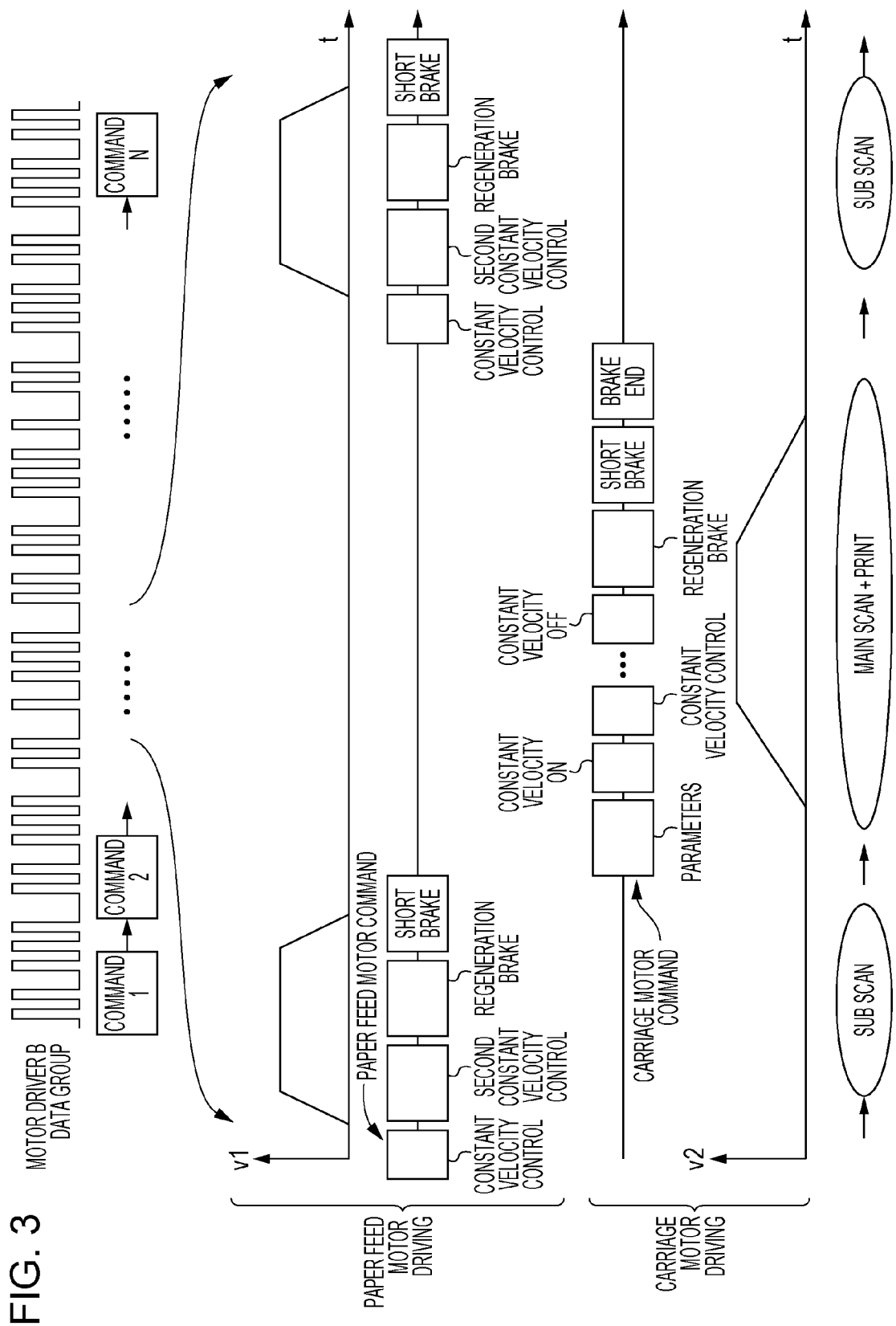
FIG. 3 is a diagram illustrating an example of a printing process executed by a paper feed unit and a carriage unit.
Figure 4:
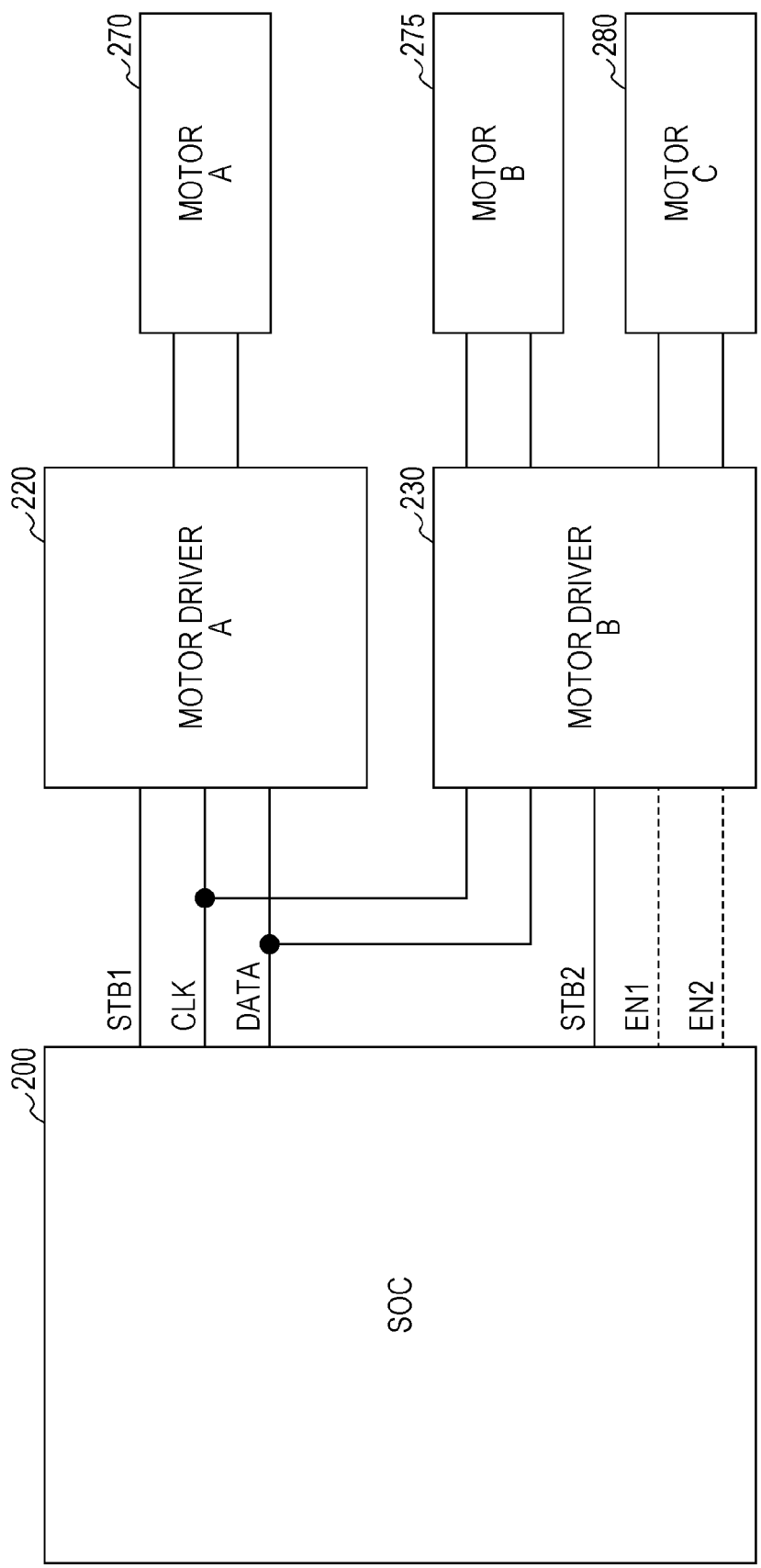
FIG. 4 is a diagram illustrating some elements of hardware that controls motor driving according to a past example.

Next, printing control carried out by the motor driver B 230 will be described. FIG. 3 is a diagram illustrating an example of a printing process carried out cooperatively by the transport unit and the carriage unit.

A data group transferred from the SOC 200 to the motor driver B 230 is a command group configured of control parameters for either the paper feed motor 250 or the carriage motor 260. FIG. 3 illustrates commands, used to instruct the actual driving of the DC motor, that are required to implement each step of the operations performed by the printing apparatus, such as "sub scan", "main scan+print", and "sub scan", with the commands indicated in association with the respective steps. In the case of a stepper motor, the aforementioned driving instruction data corresponds to the "commands" referred to here. Here, in the case where the stepper motor is, for example, a 4 W 1-2 phase excitation motor, a single rotation of the motor shaft requires 64 command transfers, and thus the data transfer rate is relatively higher than with DC motor control.

In the first "sub scan", the paper feed motor 250 is driven so that a first region of the paper is moved to a printing position at a constant velocity. In the "main scan+print", printing is executed by driving the carriage motor 260 so that a print head unit ejects ink onto the first region while moving at the constant velocity. In the final "sub scan", the paper feed motor 250 is driven so that a second region of the paper, which is printed onto after the first region, is moved to the printing position.

The steps performed by the motor that executes the "sub scan" include "constant velocity control", "second constant velocity control", "regeneration brake", and "short brake", and the SOC 200 transfers commands instructing those steps to the motor driver B 230, so that the steps will be carried out as actual driving of the paper feed motor 250. Meanwhile, the steps performed by the motor that executes the "main scan+print" include "constant velocity on", "constant velocity control", "constant velocity off", "regeneration brake", "short brake", and "brake end", and the SOC 200 transfers commands instructing those steps to the motor driver B 230, so that the steps will be carried out as actual driving of the carriage motor 260.

As a method for controlling the current supplied to the respective motors, a system may be employed where an enabling line is provided separately so that the currents supplied to the paper feed motor 250, the carriage motor 260, and so on are controlled on/off in order to rotate those motors at the constant velocity, or a system may be employed where the commands are transferred from the SOC 200 to the motor driver, data of an amount of time for which the constant velocity rotation is to be carried out as specified in the command is set in a predetermined region of a register, and the currents supplied to the motors are controlled on/off within the motor drivers by referring to the data. The latter example makes it possible to reduce the number of wires in the printing apparatus, and the driving may be carried out having set the on/off cycle of the enabling line and the duty. The enabling control may be changed on the motor driver side in synchronization with the on/off cycle.

Note that when the SOC 200 and the two motor drivers are connected by a single clock line and a single data line and at least one of the motor drivers controls two or more motors (a case where three or more motors are controlled by two motor drivers), having the SOC 200 transfer data in correspondence with either of the rise and the fall of the clock pulse makes it possible for the receiving side motor driver to divide the data into two types; however, if the SOC 200 further adds an ID and then transfers the data, the receiving side motor driver can further divide the data corresponding to the channel, or in other words, to either of the rise and the fall. Although division based on any of the edges of the clock pulse can be applied in motor control in which immediate response is required, ID-added data requires a scheme in which, for example, data corresponding to a given ID is sent after data corresponding to another ID has first been sent, and thus there is a risk that the motor control will have an insufficient speed for applications in which processes based on the data overlap and immediate response is required. Accordingly, in the case where two or more motors are to be controlled using data in a single channel that is divided by ID, it is preferable for such a scheme to be used in applications where processes based on the data do not overlap or in which processes do overlap but immediate response is not required.

The aforementioned embodiment provides the following effects.

1. In the case where a single set of data transfer lines branches and data is transferred from the SOC 200 to the motor driver A 220 and the motor driver B 230, respectively, the SOC 200 carries out the transfer when the clock signal rises and falls so that the data is data for either the motor driver A 220 or the motor driver B 230. Accordingly, the data can be selectively transferred to a plurality of slaves without increasing the number of wire connections.

2. In the case where it is necessary to transfer data from the SOC 200 to the motor driver B 230 while the SOC 200 is transferring data to the motor driver A 220 in correspondence with the rise of the clock signal, the transfer of data to the motor driver B 230 can be started in correspondence with the fall of the clock signal, without waiting for the transfer of data to the motor driver A 220 to end. This makes it possible to avoid delaying processing performed by the printing apparatus and avoid a situation in which the motor driver B 230 stands by and the paper feed motor 250, the carriage motor 260, or the like cannot be controlled.

Although an embodiment of the invention has been described with reference to the drawings, the specific configuration thereof is not intended to be limited to this embodiment, and various alterations, variations, and the like are possible without departing from the essential spirit of the invention. For example, the transfer system is not limited to being applied in a printing apparatus, and may be applied in an image display apparatus such as a projector, various types of information processing apparatuses, and so on. Furthermore, the invention is not limited to two DC motors such as the paper feed motor 250 and the carriage motor 260; the driving of three or more DC motors may be controlled by the SOC 200 adding IDs to the transferred commands so that the associations between commands and motors can be recognized.

The SOC 200 may be connected to three or more motor drivers via a single clock line and a single data line, and in such a case, adding IDs to the data in addition to dividing the data into two channels corresponding to the edges of the clock pulse as described above makes it possible to divide the data for each of the three or more motor drivers.

Furthermore, the motor is not limited to a rotationally-driven motor, and linear driving, as with a linear motor, can also be considered.

Furthermore, the apparatuses that execute the aforementioned methods may be realized by single, independent apparatuses, or may be realized by a combination of multiple apparatuses; all such forms are considered to fall within the scope of the invention.

The constituent elements and combinations thereof described in the embodiment are merely examples, and constituent elements can be added, removed, replaced, or otherwise changed without departing from the essential spirit of the invention. The invention is not limited to the descriptions of the embodiment, and is defined only by the scope of the aspects of the invention.

What is claimed is:

1. A transfer system comprising:
    a plurality of control circuits that control respective electric motors; and
    a controller, connected to the plurality of control circuits via a single data line and a single clock line, that serially transfers pieces of data instructing control of the electric motors to each of the plurality of control circuits,
    wherein the controller transfers a first piece of the data to a first of the control circuits in correspondence with the single data line at a rising edge of a clock pulse on the single clock line, and transfers a second piece of the data to a second of the control circuits in correspondence with the single data line at a falling edge of the clock pulse.

2. The transfer system according to claim 1, further comprising:
    a single load line serving as a line connecting the controller to the plurality of control circuits,
    wherein the controller transfers a signal defining a range of bit data that configures the first or the second data to the load line in correspondence with an edge of the clock pulse; and
    the first of the control circuits and the second of the control circuits identify the corresponding bit data based on the edges of the clock pulse, and execute control of the electric motor indicated by the bit data in a range of the corresponding bit data based on the edges of the clock pulse and a signal on the load line.

3. The transfer system according to claim 1,
    wherein the electric motors are stepper motors that rotate based on a pulse indicated by the data or DC motors that rotate in accordance with a DC current supplied based on a command indicated by the data, and one of the control circuits controls the rotation of one of the stepper motors or a plurality of the DC motors.

4. A printing apparatus comprising the transfer system according to claim 1.

5. A printing apparatus comprising the transfer system according to claim 2.

6. A printing apparatus comprising the transfer system according to claim 3.

* * * * *